United States Patent
Robertsson et al.

(10) Patent No.: US 7,835,224 B2
(45) Date of Patent: Nov. 16, 2010

(54) RECONSTRUCTING LOW FREQUENCY DATA RECORDINGS USING A SPREAD OF SHALLOW AND DEEP STREAMERS

(75) Inventors: Johan Olof Anders Robertsson, Grantchester (GB); Everhard Muyzert, Cambridge (GB)

(73) Assignee: WesternGeco L.L.C., Houston, TX (US)

( * ) Notice: Subject to any disclaimer, the term of this patent is extended or adjusted under 35 U.S.C. 154(b) by 331 days.

(21) Appl. No.: 12/058,903

(22) Filed: Mar. 31, 2008

(65) Prior Publication Data

US 2009/0245021 A1     Oct. 1, 2009

(51) Int. Cl.
*G01V 1/38* (2006.01)
(52) U.S. Cl. ............... 367/22; 367/20; 367/21
(58) Field of Classification Search ............ 367/15, 367/20, 21, 24, 22
See application file for complete search history.

(56) References Cited

U.S. PATENT DOCUMENTS

| | | | |
|---|---|---|---|
| 3,952,281 A * | 4/1976 | Parrack | 367/20 |
| 5,148,406 A * | 9/1992 | Brink et al. | 367/20 |
| 6,493,636 B1 | 12/2002 | DeKok | |
| 7,068,568 B2 | 6/2006 | Robertsson | |
| 7,489,590 B2 * | 2/2009 | Grion | 367/21 |
| 7,518,951 B2 * | 4/2009 | Solheim et al. | 367/130 |
| 7,660,192 B2 * | 2/2010 | Paulsen | 367/19 |

FOREIGN PATENT DOCUMENTS

| GB | 2374741 A | 10/2002 |
|---|---|---|
| GB | 2389183 A | 12/2003 |

* cited by examiner

*Primary Examiner*—Ian J Lobo

(57) ABSTRACT

A technique includes obtaining first data indicative of seismic measurements acquired by seismic sensors of a first set of towed streamers and obtaining second data indicative of seismic measurements acquired by seismic sensors of a second set of towed streamers. The second set of towed streamers is towed at a deeper depth than the first set of towed streamers. The technique includes interpolating seismic measurements based on the first and second data. The interpolation includes assigning more weight to the second data than to the first data for lower frequencies of the interpolated seismic measurements.

24 Claims, 6 Drawing Sheets

RECONSTRUCTING LOW FREQUENCY DATA RECORDINGS USING A SPREAD OF SHALLOW AND DEEP STREAMERS

BACKGROUND

The invention generally relates to reconstructing low frequency seismic data measurements using a spread of shallow and deep streamers.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes obtaining first data indicative of seismic measurements acquired by seismic sensors of a first set of towed streamers and obtaining second data indicative of seismic measurements acquired by seismic sensors of a second set of towed streamers. The second set of towed streamers is towed at a deeper depth than the first set of towed streamers. The technique includes interpolating seismic measurements based on the first and second data. The interpolation includes assigning more weight to the second data than to the first data for lower frequencies of the interpolated seismic measurements.

In another embodiment of the invention, a system includes an interface and a processor. The interface receives first data indicative of seismic measurements acquired by seismic sources of a first set of towed streamers and second data indicative of seismic measurements acquired by seismic sensors of a second set of towed streamers. The second set of towed streamers is towed at a deeper depth than the first set of towed streamers. The processor interpolates seismic measurements at locations based on the first and second data. In the interpolation, the processor assigns more weight to the second data than to the first data for lower frequencies of the interpolated seismic measurements.

In yet another embodiment of the invention, an article includes a computer accessible storage medium containing instructions that when executed by a processor-based system cause the processor-based system to receive first data indicative of seismic measurements acquired by seismic sensors of a first set of towed streamers and receive second data indicative of seismic measurements acquired by seismic sensors of a second set of towed streamers. The second set of towed streamers is towed at a deeper depth than the first set of towed streamers. The instructions when executed by the processor-based system cause the processor-based system to process the first and second data to interpolate seismic measurements based on the first and second data, and process the first and second data to determine spectral components of the interpolated seismic measurements. Additionally, instructions when executed by the processor-based system cause the processor-based system to process the first and second data to interpolate seismic measurements at locations based on the first and second data. The instructions when executed cause the processor-based system to assign more weight to the second data than to the first data for lower frequencies of the interpolated seismic measurements.

Advantages and other features of the invention will become apparent from the following drawing, description and claims.

DETAILED DESCRIPTION

Figure 1:
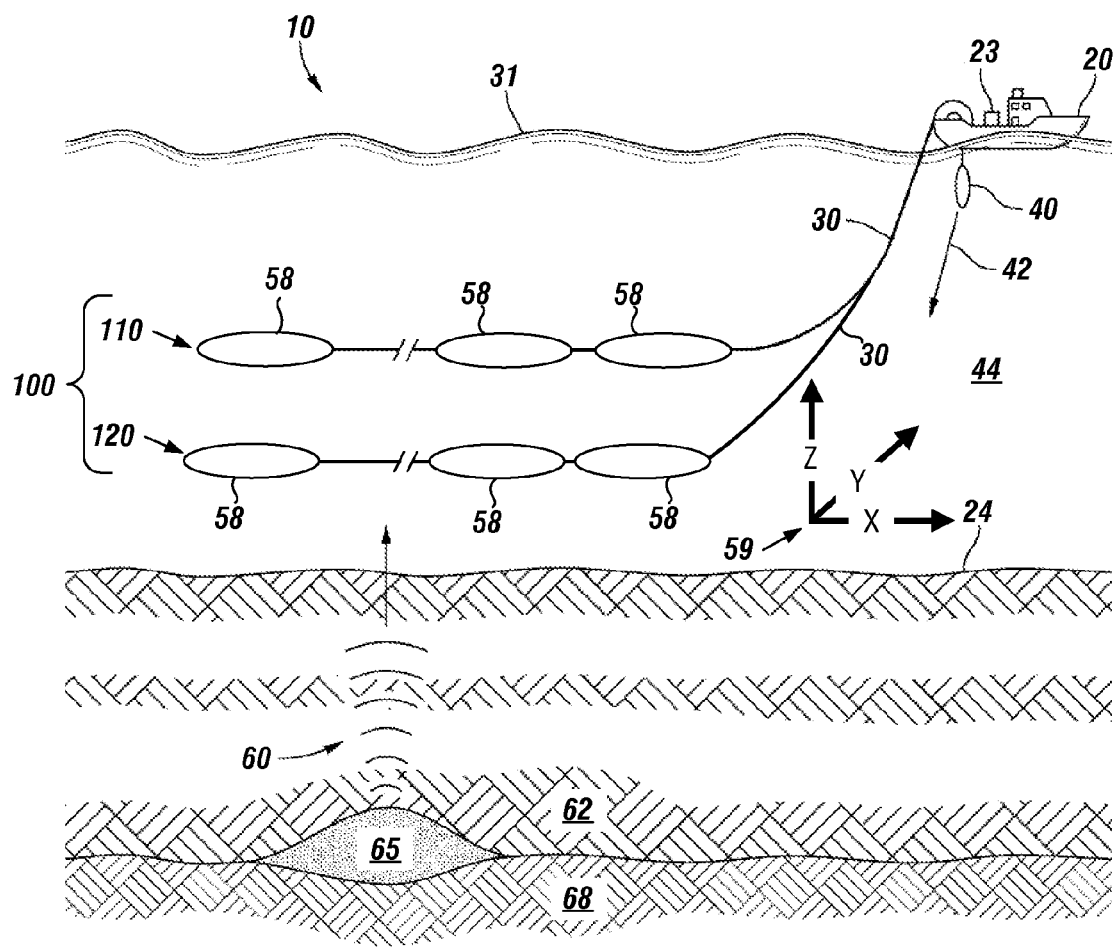
FIG. 1 is a schematic diagram of a marine-based seismic data acquisition system according to an embodiment of the invention.

FIG. 1 depicts an embodiment 10 of a marine seismic data acquisition system in accordance with some embodiments of the invention. In the system 10, a survey vessel 20 tows seismic streamers 30 behind the vessel 20. The seismic streamers 30 may be arranged in a particular geometry and may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals.

Figure 2:
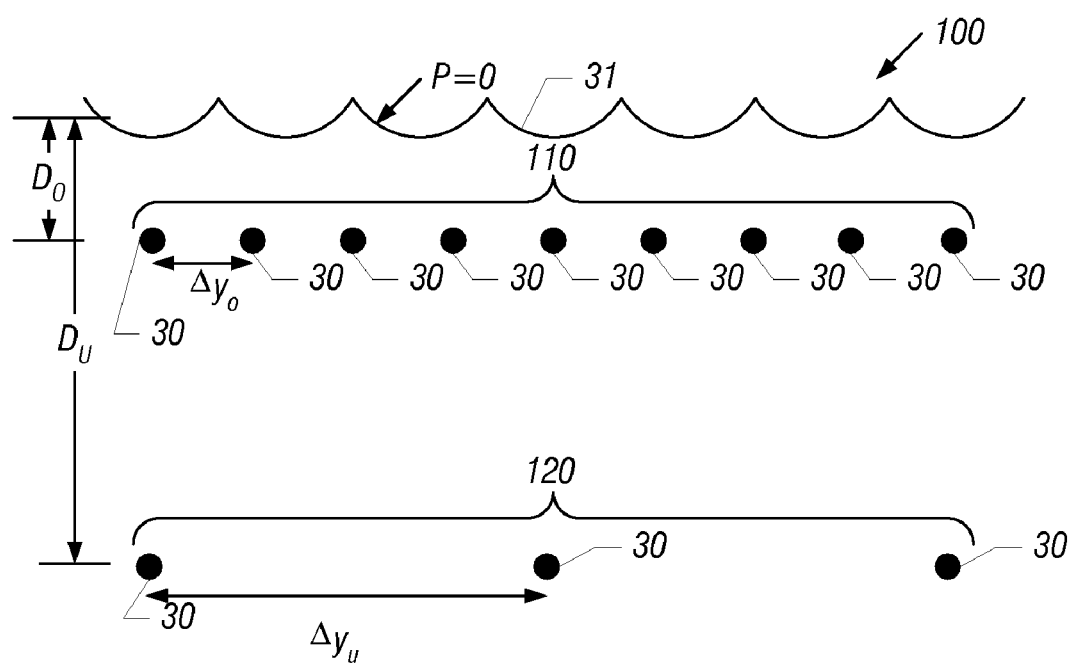
FIG. 2 is an illustration of an exemplary spread of shallow and deep streamers according to an embodiment of the invention.

In accordance with some embodiments of the invention, the survey vessel 20 tows a three-dimensional (3-D) spread 100 of streamers 30, which are depicted in a crossline view (co-planar with the y-z plane (see axes 59)) in FIG. 2. Still referring to FIG. 1, in general, the 3-D spread 100 includes a set 110 of streamers 30 (herein called the "shallow 110 set of streamers") that is generally towed in a horizontal plane that has a relatively shallow depth and a set 120 of streamers 30 (herein called the "deep set 120 of streamers") that is towed at a deeper depth.

In accordance with embodiments of the invention, the seismic sensors 58 may be hydrophones only, which are constructed to acquire pressure wavefield measurements.

In other embodiments of the invention, the seismic sensors 58 may be multi-component seismic sensors, each of which is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion (if the sensors 58 are multi-component sensors). The traces are recorded and may be at least partially processed by a signal processing unit 23 that is deployed on the survey vessel 20, in accordance with some embodiments of the invention. For example, a particular seismic sensor 58 may provide a trace, which corresponds to a measure of a pressure wavefield by its hydrophone; and for the case of a multi-component sensor, the sensor 58 may provide one or more traces that correspond to one or more components of particle motion, which are measured by its accelerometers, for example.

Figure 6:
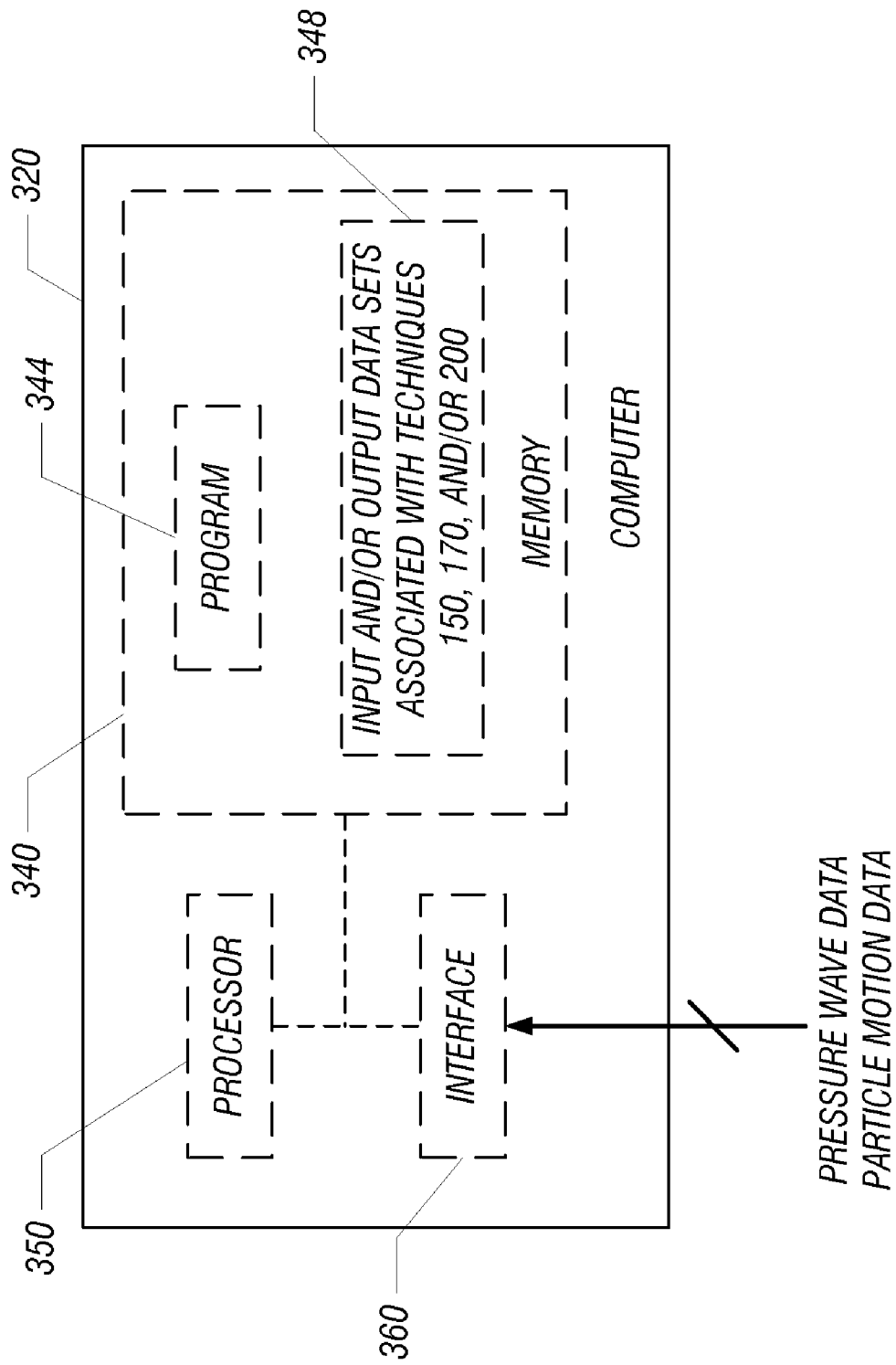
FIG. 6 is a processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary processing system 320 that is depicted in FIG. 6 and is further described below) that may be, for example, located on land or on the vessel 20. Thus, many variations are possible and are within the scope of the appended claims.

Referring to FIG. 2, in accordance with some embodiments of the invention, the 3-D spread 100 of streamers 30 has a dense over/sparse under geometry. It is noted that FIG. 2 depicts a cross-section of the spread 100, which is co-planar with the y-z plane. As shown in FIG. 2, the shallow 110 set of streamers may be generally towed in a horizontal plane that has a relatively shallow depth (called "$D_O$" in FIG. 2). Additionally, the streamers of the set 110 are relatively densely spaced apart in the crossline direction, relative to the crossline spacing of the deep set 120 of streamers, which may be generally towed in a horizontal plane that has a relatively deeper depth (called "$D_U$" in FIG. 2).

In general, the seismic sensors of the shallow set 110 of streamers acquire excellent high frequency data (data for frequencies greater than 7.5 Hz, as a non-limiting example). In other words, the seismic sensors of the shallow set 110 of streamers acquire data that have a sufficiently high signal-to-noise ratio (SNR) at high frequencies. The seismic sensors of the shallow set 110 of the streamers, however, acquire seismic data that have a relatively low SNR at low frequencies, such as frequencies below 7.5 Hz (as a non-limiting example). Unlike the seismic sensors of the shallow set 110 of streamers 30, the seismic sensors of the deep set 120 of streamers acquire data (frequencies at or below 7.5 Hz, for example), which have a relatively high SNR at the low frequencies.

Figure 3:
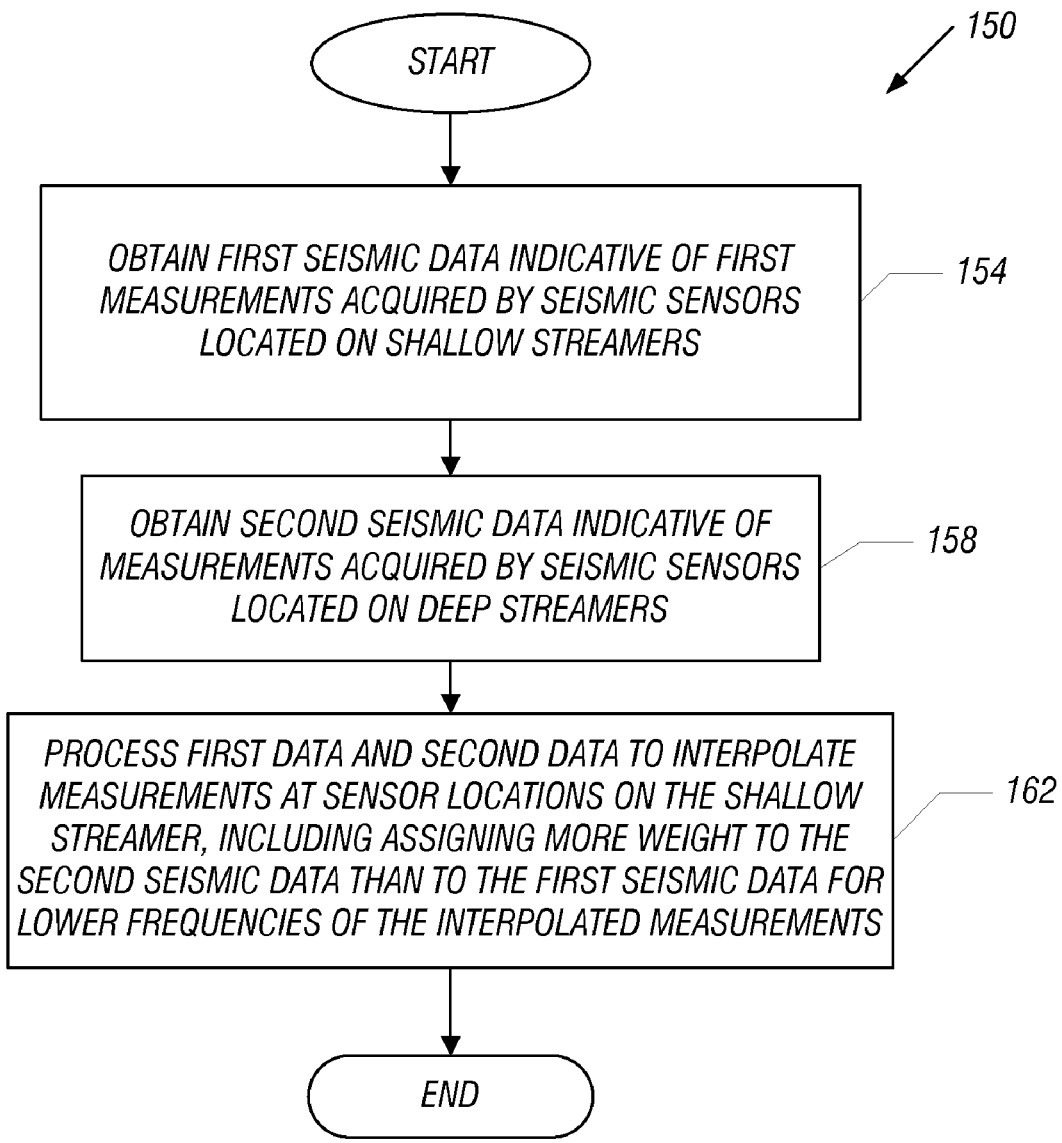
FIGS. 3, 4 and 5 are flow diagrams depicting techniques to interpolate seismic measurements based on seismic data acquired by seismic sensors of the streamer spread of FIG. 2 according to embodiments of the invention.

Referring to FIG. 3 in conjunction with FIG. 2, a technique 150 may be used for purposes of using the low frequency data acquired by the seismic sensors of the deep set 120 of streamers to reconstruct the low frequency data in the plane of the shallow set 110 of streamers. More specifically, the technique 150 includes obtaining (block 154) first seismic data, which are indicative of measurements acquired by seismic sensors of the shallow set 110 of streamers and obtaining (block 158) second seismic data, which are indicative of measurements acquired by seismic sensors of the deep set 120 of streamers. The technique 150 includes, pursuant to block 162, processing the first and second data to interpolate measurements at the sensor locations on the shallow set 110 of streamers, including assigning more weight to the second seismic data (i.e., the data acquired by the seismic sensors on the deep set 120 of streamers) than to the first seismic data (i.e., the data acquired by the seismic sensors on the shallow set 110 of streamers) for the lower frequencies of the interpolated measurements. Thus, the technique 150 may be used to construct a full set of data in the shallow plane containing the shallow set 110 of streamers, and the full set of data has a sufficiently high SNR at both low and high frequencies.

Referring to FIG. 2, as a more specific and non-limiting example, the shallow set 110 of streamers may contain approximately 9 streamers (as a non-limiting example) and may be towed at a depth $D_O$ of approximately 6 meters. The streamers of the set 110 may have a crossline spacing (called "$\Delta y_O$" in FIG. 2) of approximately 100 meters. Because of the shallow towing depth, the acquired seismic data for the shallow set 110 of streamers are deficient at low frequencies, such as frequencies below approximately 7.5 Hz (as a non-limiting example). The minimum wavelength encountered for 7.5 Hz data is 200 meters. This means that the crossline streamer spacing for the shallow set 110 of streamers needs to be at least 100 meters to sample the low frequencies sufficiently for horizontally propagating waves (i.e., waves propagating in the cross-line direction).

Continuing the example, as depicted in FIG. 2, in accordance with some embodiments of the invention, the deep set 120 of streamers may contain approximately three streamers (as a non-limiting example) that are towed at a depth $D_U$ that is approximately five times or more greater than the depth $D_O$ of the shallow set 110 of streamers. As a specific example, the depth $D_U$ may be approximately 30 meters, and the streamers of the deep set 120 are spaced apart at a crossline spacing (called "$\Delta y_U$" in FIG. 2) of approximately 400 meters.

It is noted that the above-described geometry of the 3-D spread 100 is merely for purposes of example, as other spread geometries, depths, spacing densities, number of streamers, etc., may be used in accordance with other embodiments of the invention.

The technique 150 relates to two-dimensional (2-D) interpolation in that the interpolation is performed in the vertical-crossline (z-y) planes separately at regular offsets down the length of the streamer spread 100. However, the technique 150 may be extended to 3-D interpolation across the spread 100 simultaneously as a function of inline, crossline and depth locations (i.e., a full 3-D problem). More specifically, in general, the data acquired by the shallow 110 and deep 120 sets of streamers may be processed according to a technique 170 that is set forth in FIG. 4.

Figure 4:
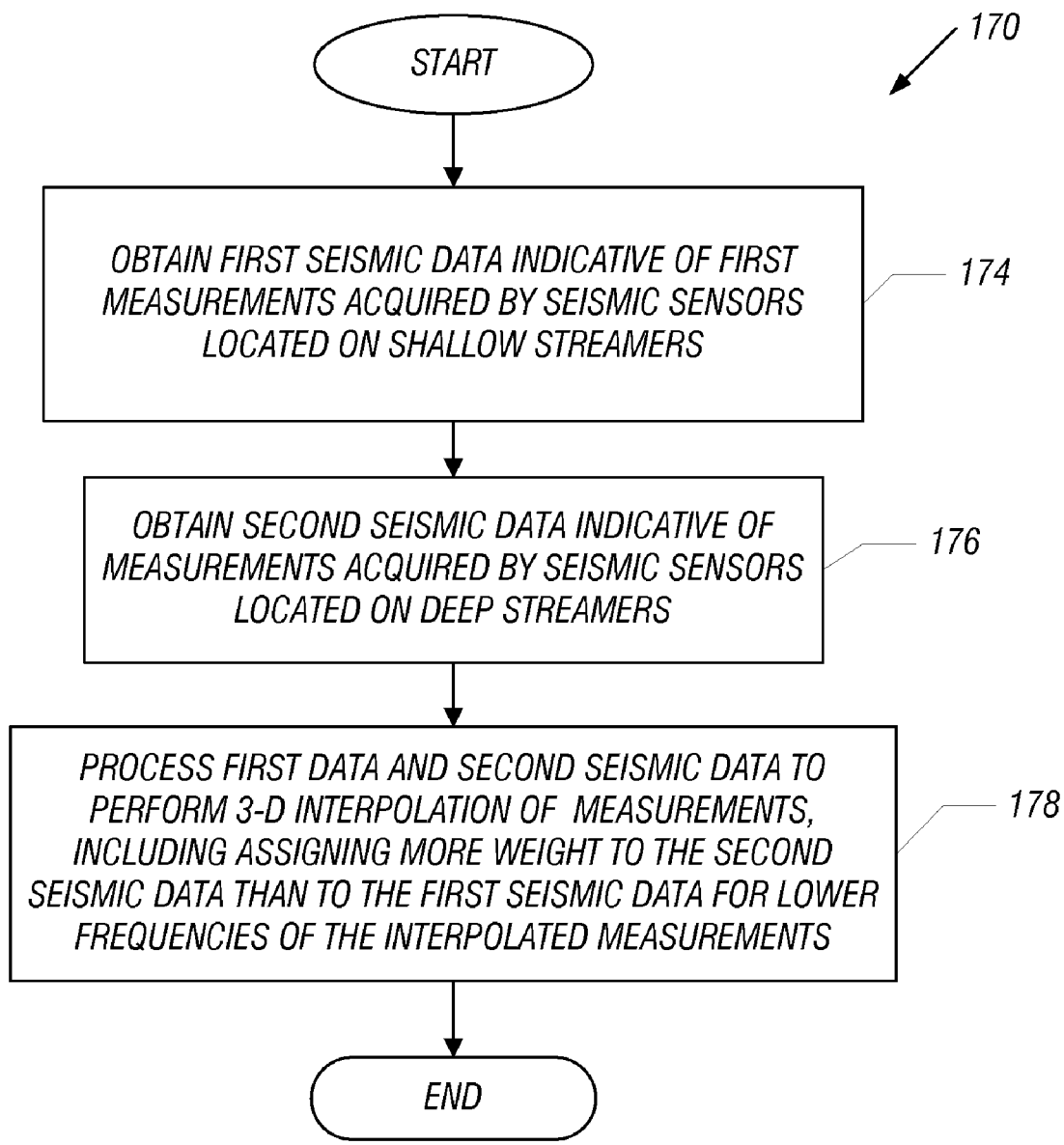

Referring to FIG. 4 in conjunction with FIG. 2, the technique 170 includes obtaining (block 174) first seismic data, which are indicative of measurements acquired by seismic sensors of the shallow set 110 of streamers and obtaining (block 176) second seismic data, which are indicative of measurements acquired by seismic sensors of the deep set 120 of streamers. The technique 170 includes, pursuant to block 178, processing the first and second seismic data to perform 3-D interpolations of measurements, including assigning more weight to the second seismic data (i.e., the data acquired by the seismic sensors on the deep set 120 of streamers) than to the first seismic data (i.e., the data acquired by the seismic sensors on the shallow set 110 of streamers) for the lower frequencies of the interpolated measurements.

It is noted that, depending on the particular embodiment of the invention, the technique may also include weighting the first seismic data relative to the second seismic data for the higher frequencies of the interpolated measurements. Thus, many variations are contemplated and are within the scope of the appended claims.

In accordance with some embodiments of the invention, the interpolation of the measurements may involve determining basis functions for an interpolated function (a pressure, particle velocity, etc.). As described in more detail below, each basis function has parameters (such as frequency and amplitude, as examples) that are determined by "error filtering" the basis function to the sampled values of the function that are represented by the first and second seismic data. The second seismic data that are provided by the deep set 120 of streamers may be weighted more heavily than the first seismic data that are provided by the shallow set 110 of streamers for the lower frequencies, i.e., second seismic data may have more influence than the first seismic data on the lower frequency basis functions; and conversely, for the upper frequencies basis functions, the first seismic data may, in accordance with some embodiments of the invention, be weighted more heavily than the second seismic data.

A number of different techniques may be used to derive the interpolated measurements, depending on the particular embodiment of the invention. As a non-limiting example, interpolation techniques are described below, which derive an interpolation function by determining parameters for basis functions that are linearly combined to form the function. However, interpolation techniques (such as a technique based on Yen's interpolation algorithm type IV, as another non-limiting example) may be used in accordance with other embodiments of the invention.

In accordance with some embodiments of the invention, the first and second seismic data may be "weighted" by manipulating an error fit between the interpolated function and the seismic data. As a non-limiting example, it may be determined that parameters for the interpolation function components, which control the lower frequencies are selected to ensure a ten times better fit to the second seismic data than to the first seismic data. Similarly, if the first seismic data are weighted more for the higher frequencies, parameters for the interpolation function components, which control the higher frequencies are selected ensure a ten times better fit to the first seismic data than to the second seismic data.

Iterative and non-iterative interpolation techniques, which determine parameters for basis functions, are described for purposes of non-limiting examples below. Each of these techniques determines basis function parameters for a particular interpolated function $f(x)$. The function $f(x)$ may be, for example, a particle motion measurement (a particle velocity, for example) or a pressure measurement.

To generalize, the following discusses the cross-line interpolation of a function called "f(x)" (which is the pressure wavefield for the specific application disclosed herein). In general, the function $f(x)$ may be represented by a sum of J sinusoids with amplitudes $A_j$, wavenumbers $k_j$ and phases $\phi_j$ as follows:

$$f(x) = \sum_{j=1}^{J} A_j \cos(2\pi k_j x + \phi_j). \qquad \text{Eq. 1}$$

To identify the parameters of the sinusoids, an algorithm called the "Matching Pursuit" algorithm may be used. The Matching Pursuit algorithm is generally disclosed in Mallat, S. G. and Zhang Z., 1993, Matching Pursuits With Time-Frequency Dictionaries, IEEE Trans. On Signal Processing, 41, 3397-3415. This is an iterative algorithm, which is used to expand a signal in terms of a linear combination of a set of waveforms. The set of waveforms used in the representation form a redundant dictionary. In other words, there are more terms in the dictionary than needed for an adequate representation. According to this model of the seismic data, the dictionary in this study consists of a set of sinusoids. The frequencies, amplitudes and phases of sinusoids are to be determined iteratively by using the Matching Pursuit algorithm. At every iteration a new sinusoid is added to the model and then the modeling error waveform, i.e., the residual, is obtained. The parameters of the sinusoid added to the model are found by optimization by minimizing the energy of the residual. Thus, if P−1 components are determined previously, the representation of the seismic data with only P−1 sinusoids may be described as follows:

$$f^{P-1}(x) = \sum_{j=1}^{P-1} A_j \cos(2\pi k_j x + \phi_j). \quad \text{Eq. 2}$$

The residual in the approximation may be described as follows:

$$r^{P-1}(x) = f(x) - \sum_{j=1}^{P-1} A_j \cos(2\pi k_j x + \phi_j). \quad \text{Eq. 3}$$

If a new expression $A_P \cos(2pk_P x + f_P)$ is added to the model, then the residual becomes the following:

$$r^{P-1}(x) = r^{P-1}(x) - A_P \cos(2\pi k_P x + \phi_P). \quad \text{Eq. 4}$$

Parameters of the new expression may be found by minimizing the energy of the residual on irregular offset locations as described below:

$$(A_p, k_p, \phi_p) = \arg\min_{A_p, k_p, \phi_p} \sum_{k=1}^{L} |r^{P-1}(x_k) - \bar{A}_P \cos(2\pi k_p x_k + \phi_p)|^2. \quad \text{Eq. 5}$$

If the new model is expressed as:

$$\bar{A}_p \cos(2\pi \bar{k}_p x_k + \phi_p) = \bar{a}_p \cos(2\pi \bar{k}_p x_k) + \bar{b}_p \sin(2\pi \bar{k}_p x_k), \quad \text{Eq. 6}$$

where $\bar{a}_p$ and $\bar{b}_p$ are defined by $$\bar{A}_p = (\bar{a}_p^2 + \bar{b}_p^2)^{1/2}, \bar{\phi}_p = -\tan^{-1}(\bar{b}_p/\bar{a}_p), \quad \text{Eq. 7}$$

then the cost function becomes linear in $\bar{a}_p$ and $\bar{b}_p$:

$$(a_P, b_P, k_P) = \quad \text{Eq. 8}$$

$$\arg\min_{A_p, k_p, \phi_p} \sum_{k=1}^{L} |r^{P-1}(x_k) - \bar{a}_p \cos(2\pi \bar{k}_p x_k) - \bar{b}_p \sin(2\pi \bar{k}_p x_k)|^2.$$

Hence, sinusoid parameters $\bar{a}_p$ and $\bar{b}_p$ which minimizes the above expression can be solved in terms of the wavenumber $\bar{k}_P$ as follows:

$$\begin{bmatrix} a_p(\bar{k}_P) \\ b_p(\bar{k}_P) \end{bmatrix} = D_P^{-1}(\bar{k}_p) d_P(\bar{k}_p), \quad \text{Eq. 9}$$

where the 2-by-2 matrix $D_P(\bar{k}_p)$ and 2-by-1 vector $d_P(\bar{k}_p)$ are defined in terms of the wavenumber $\bar{k}_p$ as follows:

$$D_P(\bar{k}_p) = \begin{bmatrix} \sum_{k=1}^{L} \cos^2(2\pi \bar{k}_p x_k) & \sum_{k=1}^{L} \sin(4\pi \bar{k}_p x_k)/2 \\ \sum_{k=1}^{L} \sin(4\pi \bar{k}_p x_k)/2 & \sum_{k=1}^{L} \sin^2(2\pi \bar{k}_p x_k) \end{bmatrix}, \text{ and} \quad \text{Eq. 10}$$

$$d_P(\bar{k}_p) = \begin{bmatrix} \sum_{k=1}^{L} r^{P-1}(x_k) \cos(2\pi \bar{k}_p x_k) \\ \sum_{k=1}^{L} r^{P-1}(x_k) \sin(2\pi \bar{k}_p x_k) \end{bmatrix}. \quad \text{Eq. 11}$$

Once the optimal value of $\bar{a}_p$ and $\bar{b}_p$ are substituted into Eq. 7, the optimization problems simplifies to the following:

$$k_P = \arg\min_{\bar{k}_p} \left\{ \sum_{k=1}^{L} |r^{P-1}(x_k)|^2 - g_P^T(\bar{k}_P) G_P^{-1}(\bar{k}_P) g_P(\bar{k}_P) \right\}, \quad \text{Eq. 12}$$

which can be alternatively posed as a maximization problem:

$$k_P = \arg\min_{\bar{k}_p} \{ g_P^T(\bar{k}_P) G_P^{-1}(\bar{k}_P) g_P(\bar{k}_P) \}. \quad \text{Eq. 13}$$

It can be shown that the objective function $g_P^T(\bar{k}_p) G_P^{-1}(\bar{k}_p) g_p(\bar{k}_p)$ is the same as the Lomb spectrum, which is widely used especially in astronomy to compute the spectrum of non-uniformly sampled time-series. Thus, the wavenumber $\bar{k}_P$ is estimated by computing the Lomb spectrum and choosing the wavenumber corresponding to the largest peak.

Since the Lomb spectrum provides a fairly good estimate of the dominant peak locations, it is conceivable to estimate several dominant wavenumbers by Eq. 13 and use these dominant wavenumbers to identify parameters of several sinusoidal components by using Eq. 9. As several sinusoidal components would be identified at each iteration, the convergence rate of the algorithm would be significantly improved with negligible increase in the computational complexity. The same wavenumber can be identified as a dominant peak at later iterations; therefore any error introduced by this type of an approach can be corrected at later stages.

For purposes of interpolating the gradient data, the gradient may be described as follows:

$$f'(x) = -\sum_{j=1}^{J} A_j 2\pi k_j \sin(2\pi k_j x + \phi_2). \quad \text{Eq. 14}$$

Because there are two sets of measurements, it is conceivable to determine the model parameters by minimizing a mixture of fit errors to both sets of measurements. For instance, if the parameters of the sinusoids up to order P−1 are determined, then the parameters of the sinusoid of order P can be determined by minimizing a weighted sum of the residual energies for data and gradient as described below:

$$(A_P, k_P, \phi_P) = \quad \text{Eq. 15}$$

$$\arg\min_{\bar{A}_p, \bar{k}_p, \bar{\phi}_p} \left\{ \sum_{k=1}^{L} |r^{P-1}(x_k) - \bar{A}_P \cos(2\pi \bar{k}_p x_k + \bar{\phi}_p)|^2 + \lambda \sum_{k=1}^{L} |(r^{P-1})'(x_k) + \bar{A}_P 2\pi k_P \sin(2\pi \bar{k}_p x_k + \bar{\phi}_p)|^2 \right\},$$

where "$\bar{A}_P \cos(2p\bar{k}_P x_k + \bar{f}_P)$" is the new model term, "$(r^{P-1})\phi(x)$" is the gradient of the residual given in Eq. 13 and l is weighting parameter which also accounts for difference of units between data and gradient measurements. If the new model term is expressed as shown in Eq. 6, then the model parameters $\bar{a}_p$ and $\bar{b}_p$ are obtained as follows:

$$\begin{bmatrix} a_P(\overline{k}) \\ b_P(\overline{k}_P) \end{bmatrix} = (D_P(k_P) + \lambda G_P(\overline{k}_P))^{-1}(d_P(k_P) + \lambda g_P(\overline{k}_P)), \qquad \text{Eq. 16}$$

where $D_P(\overline{k}_P)$, $d_P(\overline{k}_P)$ are given in Eqs. 10 and 11, and $G_P(\overline{k}_P)$, $g_P(\overline{k}_P)$ are defined in terms of the wavenumber $\overline{k}_p$ as follows:

$$G_P(\overline{k}_p) = \qquad \text{Eq. 17}$$

$$\begin{bmatrix} 4\pi^2 \overline{k}_P^2 \sum_{k=1}^{L} \sin^2(2\pi \overline{k}_p x_k) & -2\pi^2 \overline{k}_P^2 \sum_{k=1}^{L} \sin(4\pi \overline{k}_p x_k) \\ -2\pi^2 \overline{k}_P^2 \sum_{k=1}^{L} \sin(4\pi \overline{k}_p x_k)/2 & 4\pi^2 \overline{k}_P^2 \sum_{k=1}^{L} \cos^2(2\pi \overline{k}_p x_k) \end{bmatrix},$$

$$g_P(\overline{k}_p) = \begin{bmatrix} -2\pi^2 \overline{k}_P^2 \sum_{k=1}^{L} r^{P-1}(x_k)\sin(2\pi \overline{k}_p x_k) \\ 2\pi^2 \overline{k}_P^2 \sum_{k=1}^{L} (r^{P-1})'(x_k)\cos(2\pi \overline{k}_p x_k) \end{bmatrix}. \qquad \text{Eq. 18}$$

Thus, substituting $\overline{a}_p$ and $\overline{b}_p$ into Eq. 14 and simplifying the resulting equation, the 3-Dimensional minimization problem in Eq. 14 can be transformed into a 1-Dimensional maximization problem as described below:

$$k_P = \underset{\overline{k}_p}{\operatorname{argmax}} \{(d_P(\overline{k}_P) + \lambda g_P(\overline{k}_P))^T \qquad \text{Eq. 19}$$

$$(D_P(\overline{k}_P) + \lambda G_P(\overline{k}_P))^{-1}(d_P(\overline{k}_P) + \lambda g_P(\overline{k}_p))\},$$

This problem is non-linear in $\overline{k}_P$. Therefore, the wavenumber domain may be searched to find the optimal $\overline{k}_P$. Note that computation of the objective function given in Eq. 18 has the same order of complexity as that for non-uniform Fourier transform.

As an alternative, the non-iterative technique may be used to determine the cross-line spectra of P. The non-iterative technique, which is set forth below, uses a linear system equation that is solved for the cross-line spectra.

Suppose that seismic data are bandlimited to σ and approximately space-limited to the offsets [0,)L−1)σ] and L samples of signal $f(x_k)$ and its gradient $f'(x_k)$ are measured on nonuniformly spaced offsets $x_k$. The objective is to compute the values of the signal and its gradient at regularly spaced offsets $y_m = m/\sigma$. For this case, a multichannel sampling theorem may be written as follows:

$$f(x_k) = \qquad \text{Eq. 20}$$

$$\sum_{m=0}^{L/2-1} \{f(2m/\sigma) + (x_k - 2m/\sigma)f'(2m/\sigma)\} \times \operatorname{sinc}^2(\sigma x_k/2 - m),$$

$$k = 1, \ldots, L$$

Since there are L equations and L unknowns, the data and gradient samples on uniform offsets can be solved in terms of the data samples on non-uniform offsets. However, to make use of the gradient measurements, a new set of equations is set forth below, which relates the gradient values at irregular offsets to signal and gradient values at regular offsets. This new set of equations may be obtained by term-by-term differentiation of Eq. 20, which yields the following expression:

$$f'(x_k) = \sum_{m=0}^{L/2-1} 2\frac{\operatorname{sinc}(\sigma x_k - 2m) - \operatorname{sinc}^2(\sigma x_k/2 - m)}{x_k - /2m/\sigma} f(2m/\sigma) \times \qquad \text{Eq. 21}$$

$$[\operatorname{sinc}(\sigma x_k - 2m) - \operatorname{sinc}^2(\sigma x_k/2 - m)]f'(2m/\sigma), k = 1, \ldots, L$$

By using the matrix notation, these two sets of equations may be written as follows:

$$\begin{bmatrix} h \\ h' \end{bmatrix} = \begin{bmatrix} S_{11} & S_{12} \\ S_{22} & S_{22} \end{bmatrix} \begin{bmatrix} g \\ g' \end{bmatrix} \Rightarrow h = Gg, \qquad \text{Eq. 22}$$

where the entries of the L-by-L/2 submatrices $S_{11}$, $S_{12}$, $S_{21}$ and $S_{22}$ are given as follows:

$$S_{11}(k, m) = \operatorname{sinc}^2(\sigma x_k/2 - m); \qquad \text{Eq. 23}$$

$$S_{12}(k, m) = (x_k - 2m/\sigma)\operatorname{sinc}^2(\sigma x_k/2 - m); \qquad \text{Eq. 24}$$

$$S_{21}(k, m) = 2\frac{\operatorname{sinc}(\sigma x_k - 2m) - \operatorname{sinc}^2(\sigma x_k/2 - m)}{x_k - 2m/\sigma}; \text{ and} \qquad \text{Eq. 25}$$

$$S_{22}(k, m) = 2\operatorname{sinc}(\sigma x_k - 2m) - \operatorname{sinc}^2(\sigma x_k/2 - m); \qquad \text{Eq. 26}$$

for $1 \leq k \leq L$, $0 \leq m \leq L/2-1$.

The entries of L-dimensional vectors h, h', g and g' are given as follows:

$$g(m) = f(2m/\sigma), \qquad \text{Eq. 27}$$

$$g'(m) = f'(2m/\sigma), \qquad \text{Eq. 28}$$

$$h(x_k) = f(x_k), \qquad \text{Eq. 29}$$

$$h'(x_k) = f'(x_k), \qquad \text{Eq. 30}$$

for $1 \leq k \leq L$, $0 \leq m \leq L/2-1$.

Since the dimension of G is 2L-by-L, the equations above set forth an over-determined linear system of equations. Thus, Eq. 22 may be solved for data and gradient samples at uniformly spaced offsets by using a regularized least squares inversion:

$$\overline{g} = (\overline{G}^T W_1 \overline{G} + W_2)^{-1} \overline{G}^T W_1 \overline{h}, \qquad \text{Eq. 31}$$

where "$W_2$" may be usually chosen as a small multiple of identity matrix, i.e., $W_2 = \epsilon^2 I$, and $W_1$ is chosen as a diagonal matrix. Once the regular samples with $2m/\sigma$ spacing are computed, the multichannel sampling theorem that is set forth below may be used to compute data samples at any arbitrary location, as described below:

$$f(x) = \sum_{m=-\infty}^{\infty} \{f(2m/\sigma) + (x - 2m/\sigma)f'(2m/\sigma)\}\operatorname{sinc}^2(\sigma x/2 - m). \qquad \text{Eq. 32}$$

If seismic data are aliased up to twice the Nyquist wavenumber, i.e., 2σ, regularization of seismic data is still possible due to the availability of the gradient measurements. In this case, the multichannel sampling theorem for seismic data and gradient may be expressed as follows:

$$f(x_k) = \sum_{m=0}^{L/2-1} \{f(m/\sigma) + (x_k - m/\sigma)f'(m/\sigma)\}\text{sinc}^2(\sigma x_k/2 - m), \quad \text{Eq. 33}$$

and $$f'(x_k) = \sum_{m=0}^{L/2-1} 2\frac{\text{sinc}(2\sigma x_k - 2m) - \text{sinc}^2(\sigma x_k - m)}{(x_k - m/\sigma)} f(m/\sigma) \times \quad \text{Eq. 34}$$

$$[2\text{sinc}(2\sigma x_k - 2m) - \text{sinc}^2(\sigma x_k - m)]f'(m/\sigma), k = 1, \ldots, L/2$$

By using the matrix notation, Eqs. 32 and 33 may be written as follows:

$$\begin{bmatrix} \overline{h} \\ \overline{h}' \end{bmatrix} = \begin{bmatrix} \overline{S}_{11} & \overline{S}_{12} \\ \overline{S}_{22} & \overline{S}_{22} \end{bmatrix} \begin{bmatrix} \overline{g} \\ \overline{g}' \end{bmatrix} \Rightarrow \overline{h} = \overline{G}\overline{g}, \quad \text{Eq. 35}$$

where the entries of the L/2-by-L/2 submatrices $\overline{S}_{11}, \overline{S}_{12}, \overline{S}_{21}$ and $\overline{S}_{22}$ are given as follows:

$$\overline{S}_{11}(k, m) = \text{sinc}^2(\sigma x_k - m); \quad \text{Eq. 36}$$

$$\overline{S}_{12}(k, m) = (x_k - m/\sigma)\text{sinc}^2(\sigma x_k - m); \quad \text{Eq. 37}$$

$$\overline{S}_{21}(k, m) = 2\frac{\text{sinc}(2\sigma x_k - 2m) - \text{sinc}^2(\sigma x_k - m)}{x_k - 2m/\sigma}; \quad \text{Eq. 38}$$

$$\overline{S}_{22}(k, m) = 2\text{sinc}(2\sigma x_k - 2m) - \text{sinc}^2(\sigma x_k - m); \quad \text{Eq. 39}$$

for $1 \leq k \leq L$, $0 \leq m \leq L/2 - 1$.

The entries of L/2-dimensional vectors $\overline{h}, \overline{h}', \overline{g}$ and $\overline{g}'$ are given as follows:

$$\overline{g}(m) = f(m/\sigma), \quad \text{Eq. 40}$$

$$\overline{g}'(m) = f'(m/\sigma), \quad \text{Eq. 41}$$

$$\overline{h}(x_k) = f(x_k), \text{ and} \quad \text{Eq. 42}$$

$$\overline{h}'(x_k) = f'(x_k). \quad \text{Eq. 43}$$

Because there are L equations and L unknowns, the system of equations set forth above may be solved for seismic data and gradient samples at uniformly spaced locations. In cases where the system of equations is not well conditioned, a regularized inversion may be performed as set forth below:

$$\overline{g} = (\overline{G}^T W_1 \overline{G} + W_2)^{-1} \overline{G}^T W_1 \overline{h}, \quad \text{Eq. 44}$$

where $W_2$ is usually chosen as a small multiple of identity matrix, i.e., $W_2 = \epsilon^2 I$; and $W_1$ is chosen as a diagonal matrix. Once the regular samples with m/σ spacing are computed, the multichannel sampling theorem set forth in Eqs. 33 and 34 may be used to compute data samples at any arbitrary location.

Figure 5:
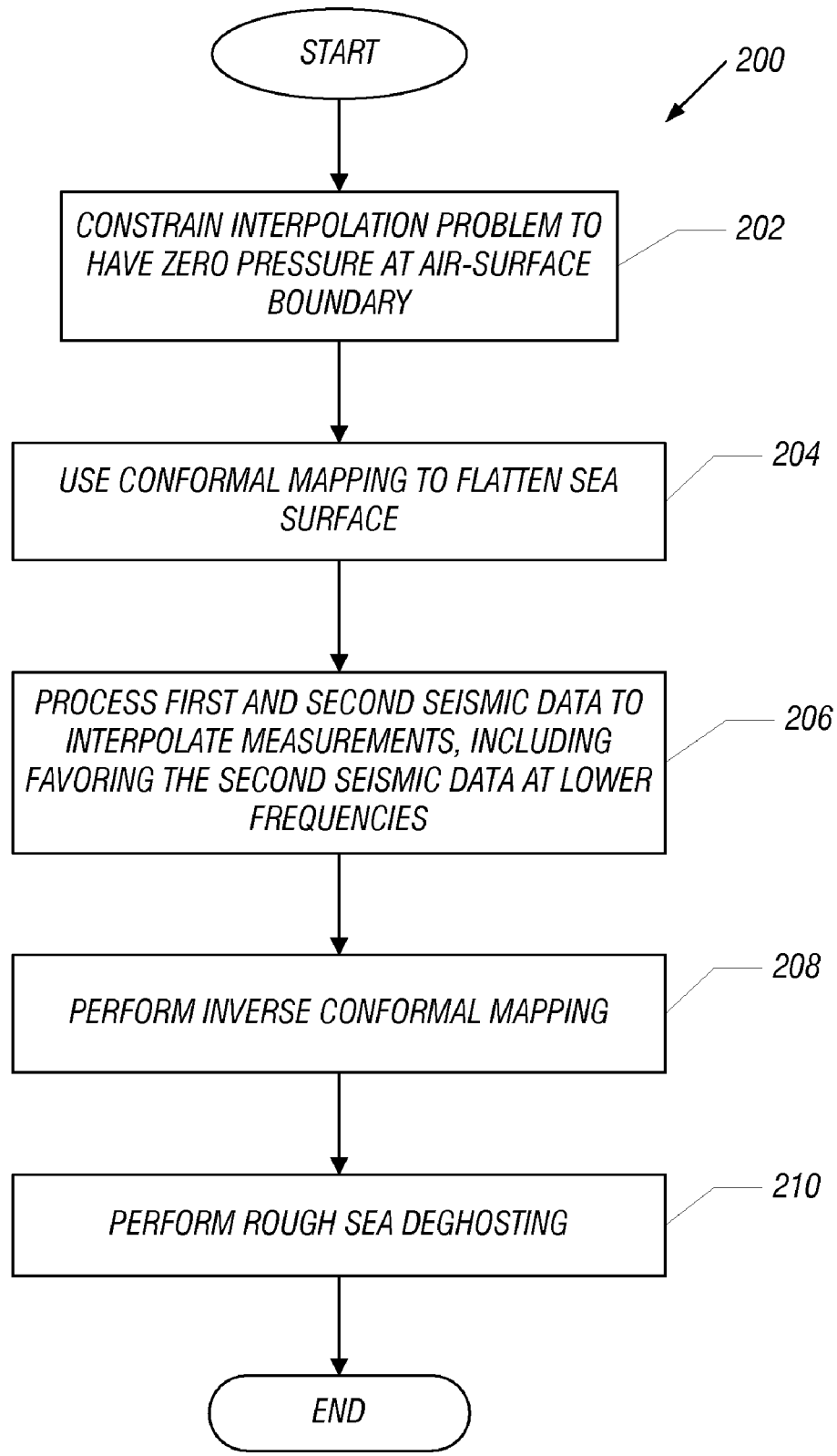

In accordance with some embodiments of the invention, FIG. 5 depicts a technique 200 that represents a workflow for reconstructing the low frequency data in the shallow set 110 of streamers. Pursuant to the technique 200, the interpolation problem is constrained (block 202) to have zero pressure at the air-surface boundary, i.e., zero pressure at the sea surface 31 (see FIG. 2). It is noted that the free surface may be incorporated to constrain the derivation of the basis function noted above in a natural way. As described above, sinusoidal basis functions are used. For these basis functions, mirror imaging may be used to construct a mirroring image above the sea surface 31 for purposes of causing the pressure at the sea surface 31 to go to zero. Another way to constrain the free surface pressure to be zero is to use non-sinusoidal basis functions, such as Chebychev functions, for example.

The technique 200 may also include using conformal mapping to flatten the sea surface, pursuant to block 204. More specifically, a rough sea surface may be naturally accounted for if the wave heights across the spread are known. The interpolation problem may be regularized through conformal mapping to flatten the sea surface. After the conformal mapping has been performed, the first and second seismic data may then be processed, pursuant to block 206, to interpolate measurements, and this interpolation includes favoring the second data at the lower frequencies as discussed above.

After the low frequencies are reconstructed in the conformal space, the rough sea surface may then be reapplied, i.e., inverse conformal mapping may be performed, pursuant to block 208, to again determine the data at the original streamer locations.

The above-described conformal mapping technique does not remove the rough sea perturbation but instead allows the low frequency reconstruction to be consistent with the rough sea surface. The actual rough sea surface perturbations may then be removed in a subsequent task that involves performing rough sea deghosting, pursuant to block 210. As an example, the rough sea deghosting may be a technique that is similar to the one described in Amundsen, L., Roesten, T., Robertsson, J. O. A., and Kragh, E., entitled, "Rough-Sea Deghosting of Single Streamer Seismic Data Using Pressure Gradient Approximations," Geophysics, 70, V1-V9, 2005, or in Robertsson, J. O. A., and Kragh, E., entitled "Rough Sea Deghosting Using A Single Streamer and A Pressure Gradient Approximation, Geophysics, 67, 2005-2011, 2002.

Other embodiments are within the scope of the appended claims. For example, in accordance with other embodiments of the invention, all of the streamers 30 of the shallow 110 or deep 120 set may not be towed in the same horizontal plane. For example, in accordance with some embodiments of the invention, the streamers 30 of the deep set 120 may be towed at different depths (all of which are still significantly deeper than the streamers 30 of the shallow set 110). The towing of the deep set 120 of streamers at different depths may be advantageous in interpolating the measurements.

Referring to FIG. 6, in accordance with some embodiments of the invention, a processing system 320 may perform at least part of the techniques that are disclosed herein for purposes of interpolating measurements based on the data that are acquired from the shallow set 110 and deep set 100 of streamers. In accordance with some embodiments of the invention, the system 320 may include a processor 350, such as one or more microprocessors and/or microcontrollers. The processor 350 may be located on a streamer 30 (FIG. 1), located on the vessel 20 or located at a land-based processing facility (as examples), depending on the particular embodiment of the invention.

The processor 350 may be coupled to a communication interface 360 for purposes of receiving seismic data that corresponds to the acquired pressure and/or particle motion measurements from the shallow 110 and deep 112 sets of streamers. Thus, in accordance with embodiments of the invention described herein, the processor 350, when executing instructions stored in a memory of the seismic data processing system 320, may receive seismic data that are acquired by the seismic sensors 58 (see FIG. 1) while in tow (seismic sensors located on streamers, for example). It is noted that, depending on the particular embodiment of the invention, the seismic data may be data that is directly received from the seismic sensors 58 as the data are being acquired (for the case in which the processor 350 is part of the survey system, such as part of the vessel or streamer) or may be seismic data that were previously acquired by the seismic sensors while in tow and stored and communicated to the processor 350, which may be in a land-based facility, for example.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the seismic data processing system 320 and may store, for example, various input and/or output data sets involved with the techniques 150, 170 and/or 200, as indicated by reference numeral 348. The memory 340 may store program instructions 344, which when executed by the processor 350, may cause the processor 350 to perform one or more of the techniques that are disclosed herein, such as the techniques 150, 170 and/or 200 and display results obtained via the technique(s) on a display (not shown in FIG. 6) of the system 320, in accordance with some embodiments of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   obtaining first data indicative of seismic measurements acquired by seismic sensors of a first set of towed streamers;
   obtaining second data indicative of seismic measurements acquired by seismic sensors of a second set of towed streamers, the second set of towed streamers being towed at a deeper towing depth than the first set of towed streamers; and
   interpolating seismic measurements at locations based on the first and second data, comprising assigning more weight to the second data than to the first data for lower frequencies of the interpolated seismic measurements.

2. The method of claim 1, wherein the locations comprises sensor locations on the first set of towed streamers.

3. The method of claim 1, wherein the act of interpolating comprises performing three-dimensional interpolation.

4. The method of claim 1, wherein the act of interpolating comprises performing two-dimensional interpolation.

5. The method of claim 1, wherein the act of interpolating further comprises assigning more weight to the first data than to the second data for higher frequencies of the interpolated seismic measurements.

6. The method of claim 1, wherein the seismic sensors of the first and second sets of towed streamers comprise hydrophones.

7. The method of claim 1, wherein the lower frequencies comprise frequencies less than approximately 7.5 Hertz.

8. The method of claim 1, wherein
   the first set of streamers comprise first streamers towed in substantially a first plane,
   the second set of streamers comprise second streamers towed in substantially a second plane,
   the first streamers have an associated first streamer spacing,
   the second streamers have an associated second streamer spacing, and
   the second streamer spacing is greater than the first streamer spacing.

9. The method of claim 8, wherein the second streamer spacing is approximately three times greater than the first streamer spacing.

10. The method of claim 8, wherein the second plane is approximately five times deeper than the first plane.

11. The method of claim 1, wherein the interpolating comprises modeling the interpolated seismic measurements such that a water-air interface has a pressure of zero.

12. The method of claim 1, further comprising:
    applying conformal mapping to transform the locations into a space in which a water-air interface is flat;
    performing the interpolation; and
    performing inverse conformal mapping after the interpolation.

13. The method of claim 12, further comprising:
    applying rough sea deghosting to the interpolated measurements after the inverse conformal mapping.

14. A system comprising:
    an interface to:
       receive first data indicative of seismic measurements acquired by seismic sensors of a first set of towed streamers; and
       receive second data indicative of seismic measurements acquired by seismic sensors of a second set of towed streamers, the second set of towed streamers being towed at a deeper depth than the first set of towed streamers; and
    a processor to interpolate seismic measurements at locations based on the first and second data, the interpolation including the processor assigning more weight to the second data than to the first data for lower frequencies of the interpolated seismic measurements.

15. The system of claim 14, wherein the locations comprise sensor locations in the first set of towed streamers.

16. The system of claim 14, wherein the interpolation comprises three-dimensional interpolation.

17. The system of claim 14, wherein the interpolation comprises two-dimensional interpolation.

18. The system of claim 14, wherein the processor is adapted to assign more weight to the first data than to the second data for higher frequencies of the interpolated seismic measurements.

19. The system of claim 14, further comprising:
    a survey vessel to tow a streamer spread including the first and second set of streamers.

20. The system of claim 14, wherein the processor is located on one of the streamers.

21. An article comprising a computer accessible storage medium containing instructions that when executed by a processor-based system cause the processor-based system to:
    receive first data indicative of seismic measurements acquired by seismic sensors of a first set of towed streamers;
    receive second data indicative of seismic measurements acquired by seismic sensors of a second set of towed streamers, the second set of towed streamers being towed at a deeper depth than the first towed streamers; and process the first and second data to interpolate seismic measurements at locations based on the first and second data, the interpolation including assigning more weight to the second data than to the first data for lower frequencies of the interpolated seismic measurements.

22. The article of claim 21, wherein the locations comprise sensor locations in the first set of towed streamers.

23. The article of claim 21, wherein the interpolation comprises three-dimensional interpolation.

24. The article of claim 21, wherein the interpolation comprises two-dimensional interpolation.

* * * * *